(No Model.)
H. M. DU BOIS.
TIRE FOR VEHICLE WHEELS.
No. 397,458. Patented Feb. 5, 1889.
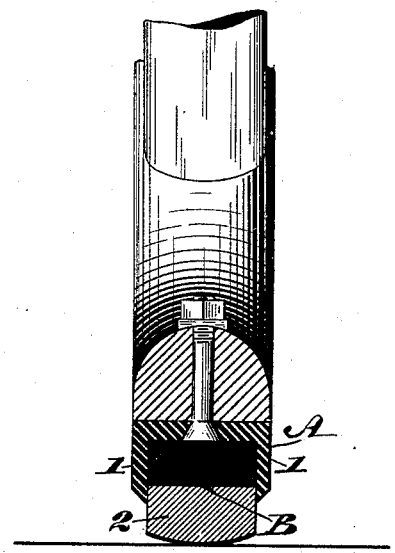
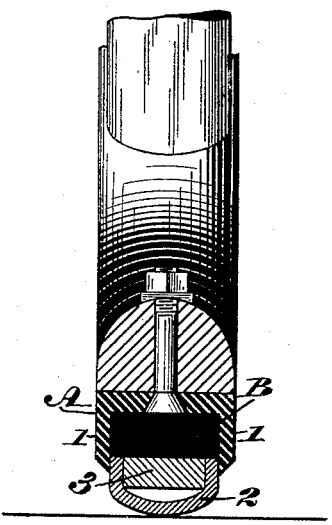 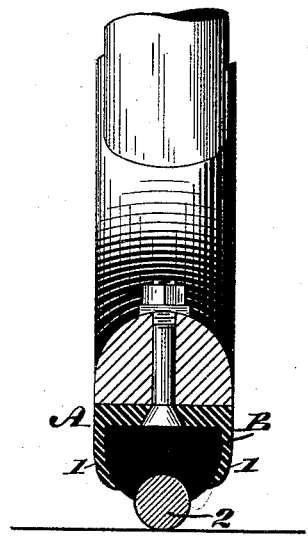
Witnesses.
L. Douville,
A. P. Jennings.
Inventor
Howard M. DuBois
By his Attorneys
Diederoheim + Kintner
N. PETERS, Photo-Lithographer, Washington, D. C.

UNITED STATES PATENT OFFICE.

HOWARD M. DU BOIS, OF PHILADELPHIA, PENNSYLVANIA.

TIRE FOR VEHICLE-WHEELS.

SPECIFICATION forming part of Letters Patent No. 397,458, dated February 5, 1889.

Application filed November 1, 1888. Serial No. 289,749. (No model.)

*To all whom it may concern:*

Be it known that I, HOWARD M. DU BOIS, a citizen of the United States, residing in the city and county of Philadelphia, State of Pennsylvania, have invented a new and useful Improvement in Tires for Vehicle-Wheels, which improvement is fully set forth in the following specification and accompanying drawings.

My invention consists of the construction of a tire of outer and inner metallic tires with rubber or other elastic material interposed between the same, whereby the advantages of such material are obtained without subjecting the material to contact with the road-surface, the outer tire being upset, so that fastening bolts, screws, or other clamping devices are obviated in connecting said outer tire with the inner one.

Figure 1 represents a section of a tire for a vehicle-wheel embodying my invention. Figs. 2 and 3 represent sections of modifications thereof.

Similar letters and numerals of reference denote corresponding parts in the several figures.

Referring to the drawings, A represents a tire, which is adapted to be secured to a wheel in well-known manner, and having side flanges, 1, forming a circumferential channel, within which is a ring, B, and an exterior tire, 2, said tires being formed of wrought-iron or steel and said ring of soft rubber or other elastic material. When the ring is primarily located, its outer periphery is flush, or approximately so, with the periphery of the flanged tire, and the inner diameter of the outer tire is of such dimension as to pass freely over the periphery of the flanged tire and encircle the rubber ring. The exterior tire is then upset, and its diameter is thereby reduced, so as to compress the rubber ring and bring its inner diameter within the outer periphery of the flanges, and thus inclose the outer tire therein and prevent it from displacement. It will be seen that the tire has the combined advantages of metal and elastic material without subjecting said material to contact with the road, the tread, on the contrary, being metal.

By the employment of the upset tire, which, as has been stated, has its diameter primarily reduced, so as to be less than the outer periphery of the flange 1, said tire retains its position within said flanges without the use of bolts or screws, which would necessitate the perforation of the outer tire, thereby weakening the same and occasioning increased expense and weight of the wheel. Furthermore, the rubber ring is inclosed within the two tires, and thus protected from wear, and the tire is adapted to be used with either heavy or light vehicles and loads.

In Fig. 2 the outer tire is hollow or channeled and receives a sole or ring, 3, of soft rubber, which may be integral with the ring B, or a separate piece placed thereagainst.

In Fig. 3 the exterior tread is shown in the form of round iron or steel in cross-section, and the flanges are bent inwardly, so as to clinch the rubber ring without, however, producing different results, the ring in each case serving as a cushion, which receives the impact of the exterior tire, thus rendering the riding easy and comparatively noiseless.

Having thus described my invention, what I claim as new, and desire to secure by Letters Patent, is—

1. In a tire, an inner metallic tire and a cushion, in combination with an outer upset tire, substantially as described.

2. A tire consisting of inner metallic tire and outer upset metallic tire with an interposed cushion, the inner tire having side flanges, forming a channel receiving said cushion and outer tire, substantially as described.

HOWARD M. DU BOIS.

Witnesses:
JOHN A. WIEDERSHEIM,
A. P. JENNINGS.